US 9,200,629 B2

(12) United States Patent
Palka et al.

(10) Patent No.: US 9,200,629 B2
(45) Date of Patent: Dec. 1, 2015

(54) SYSTEM AND METHOD FOR DETERMINATION OF POLISHED ROD POSITION FOR RECIPROCATING ROD PUMPS

(76) Inventors: Krzysztof Palka, Calgary (CA); Jaroslaw Czyz, Calgary (CA)

(*) Notice: Subject to any disclaimer, the term of this patent is extended or adjusted under 35 U.S.C. 154(b) by 676 days.

(21) Appl. No.: 13/533,559

(22) Filed: Jun. 26, 2012

(65) Prior Publication Data

US 2013/0030721 A1  Jan. 31, 2013

(30) Foreign Application Priority Data

Jun. 27, 2011   (CA) .................................. 2744324

(51) Int. Cl.
*F04B 47/02*   (2006.01)
*F04B 53/14*   (2006.01)
*G01D 5/14*    (2006.01)

(52) U.S. Cl.
CPC .............. *F04B 47/028* (2013.01); *F04B 47/026* (2013.01); *F04B 53/144* (2013.01); *F04B 2201/1211* (2013.01); *G01D 5/145* (2013.01)

(58) Field of Classification Search
CPC ..................................................... F04B 47/026
USPC .......................................................... 702/41
See application file for complete search history.

(56) References Cited

U.S. PATENT DOCUMENTS

| 4,973,226 | A | * | 11/1990 | McKee | ............................. | 417/18 |
| 5,246,076 | A | * | 9/1993 | Watson | .......................... | 166/369 |
| 7,168,924 | B2 | | 1/2007 | Beck et al. | | |

FOREIGN PATENT DOCUMENTS

WO    WO9302289 A1    2/1993

OTHER PUBLICATIONS

J. G. Svinos, Exact Kinematic Analysis of Pumping Units, Society of Petroleum Engineer (SPE 2201), 58th Annual Technical Conference and Exhibition, San Francisco, CA (Oct. 5-8, 1980).
API Specification 11E, Specification for Pumping Units, Mar. 2009.
Gabor Tackacs, Modern Sucker-Rod Pumping 80-91 (PenWell Publishing Company, 1993).
S. G. Gibbs, Computing Gearbox Torque and Motor Loading for Beam Pumping Units With Consideration of Inertia Effects, 27 J. Petroleum Tech. 9, 1153-59, (1975).
J. N. McCOY et al., A Polished Rod Tranducer for Quick and Easy Dynagraphs, Proceedings of the Annual Southwestern Petroleum Short Course 39 (1992).
Lufkin Automation Beam Mounted Transducer, Lufkin Industries, LLC., (Sep. 6, 2012), http://www.lufkin.com.

* cited by examiner

*Primary Examiner* — Bryan Bui
(74) *Attorney, Agent, or Firm* — Stephen J. Lewellyn; Maxey Law Offices, PLLC

(57) ABSTRACT

A system and method for measurement of a polished rod movement in a reciprocating rod pumping system comprising reciprocal motive elements is provided. A proximity sensor target is mounted on the polished rod while a corresponding sensor element, is mounted in fixed relation to the pumping system, for example in fixed relation to the wellhead or ground. The sensor detects passage of the proximity sensor target, and thus the polished rod, as it moves in opposite directions during a single stroke cycle. The time of passage and the speed of the polished rod, as determined from its kinematic relationship with other pumping system components, is used to determine the position of the polished rod at any point during the cycle. The proximity sensor target may be mounted on a walking beam or other reciprocally moving element, with the sensor positioned in a corresponding fixed location.

37 Claims, 3 Drawing Sheets

SYSTEM AND METHOD FOR DETERMINATION OF POLISHED ROD POSITION FOR RECIPROCATING ROD PUMPS

BACKGROUND

1. Technical Field

The present application relates to operation of a downhole pumping system, and in particular to measurement of polished rod position of a reciprocating rod pump.

2. Description of the Related Art

In a reciprocating rod pumping system, the polished rod is connected to a sucker rod that drives a plunger of a downhole pump. Pumping fluids from downhole to the surface is achieved by the polished rod reciprocating motion induced by a prime mover using a pumpjack and a set of speed reducers, including sheaves, jackshafts and a gearbox.

The position of a polished rod obtained for the entire pumping cycle is often used for the diagnostic analysis and control of the reciprocating rod pumps. Diagnostic analysis allows for an evaluation of the performance of a reciprocating rod pump based on simultaneous measurements of the polished rod load and position as a function of time, taken at several points during a single pumping cycle. A set of such measurements is called a "surface card", "surface dynamometer card" or simply a "DYNO card", and allows for determination of stress distribution along the entire rod system for the entire stroke. It is also used for calculation of the "downhole card", which represents the loads and displacements of the downhole pump plunger over the entire cycle. The downhole card is used for determination of pump production and pump fillage as well as identification of pump-off conditions, gas interference, valve leakage, insufficient tubing anchoring and a number of other conditions affecting pumping efficiency. The calculation of the downhole card can be performed in real time or any time later after collecting the data. The real time measurements of the polished rod load and position are used by most controllers that control the operation of pumping units installed on hydrocarbon producing wells, such as pump-off-controllers (POC) or variable speed controllers equipped with a variable frequency drive (VFD).

Typically, the polished rod load recorded in the surface card is obtained using a load cell or strain gauges mounted between the carrier bar and the polished rod clamps. Alternatively, it can be measured based on changes in the polished rod strain, or in case of beam pumping units, it can also be measured using beam mounted strain gauges that measure walking beam deformation. Polished rod load may also be estimated from measurements of the prime mover torque and the crank or polished rod position.

The polished rod position may be measured using a variety of sensors mounted on different moving parts of the pumping system. In one method, accelerometers are installed on the polished rod and the rate of change of speed of the polished rod is measured. However, the accuracy of this method is poor, particularly in determination of the stroke start position (especially in case of high dynamics of the polished rod movement, including vibrations).

In the case of a beam pumping unit with a walking beam, the polished rod position can be calculated from the inclination of the walking beam. The inclination can be measured using an inclinometer or an encoder sensing beam rotation (angular position). However, the accuracy of the inclinometer is adversely affected by the pumping system operating conditions, particularly in the presence of vibrations; the encoder may be prone to failure due to difficulties in mounting the parts of the encoder around the central bearing of the walking beam, which are constantly rotating with respect to each other when the pump is in operation.

Another method of determining polished rod position of a beam pumping unit consists of calculating it from the crank position. The crank position is typically inferred from motor speed and the system's reduction ratio, as well as from the initial crank angle at the start of the stroke. Typically, the start of the stroke is triggered by a sensor detecting the passage of the crank at a certain crank angle that needs to be physically measured by a technician during the calibration. Motor speed, in turn, is measured from an encoder or from a VFD. The encoder may comprise a sensor detecting motor shaft revolutions. However, the use of crank position to compute polished rod position may thus require multiple sensors or encoders, as both the motor speed and the initial crank angle must be determined, and these determinations may include inherent inaccuracies, particularly when it comes to determination of the initial crank angle. Further, installing sensors for detecting the crank start position is potentially unsafe, since the worker installing and adjusting the location of the sensor may be pinched or hit by the rotating crank or counterweight.

In a long-stroke pumping unit where the polished rod position is controlled by the movement of a chain propelled by a sprocket mounted on the gearbox output shaft, the polished rod position can be calculated based on the chain position. The chain position is determined from measurements of sprocket revolutions occurring since the beginning of the stroke that is typically triggered by detecting the passage of a selected point along the chain. The location of this point needs to be physically measured, e.g. in terms of the distance traveled by the chain until this point reaches the lowest point. The sprocket revolutions may be measured directly or based on motor revolutions, which require using an encoder when motor is not controlled by VFD.

The foregoing methods, generally, require initial calibration that may be difficult, and/or careful positioning of sensors, which in some circumstances may be inherently dangerous. Further, methods for indirectly determining polished rod position are subject to inaccuracies in the calculations used to infer the polished rod position. Any such inaccuracies may adversely affect the calculation of the surface card, particularly when the polished rod load is not measured directly, but is estimated based on the measured torque and the determined above polished rod position. Other methods require multiple sensors or sensors that might be prone to failure.

Therefore, there is a need for a system for measuring polished rod position during the entire stroke with improved accuracy and that may optionally be self-calibrating.

BRIEF DESCRIPTION OF THE DRAWINGS

In drawings which illustrate by way of example only embodiments of the present application.

DETAILED DESCRIPTION

Figure 1:
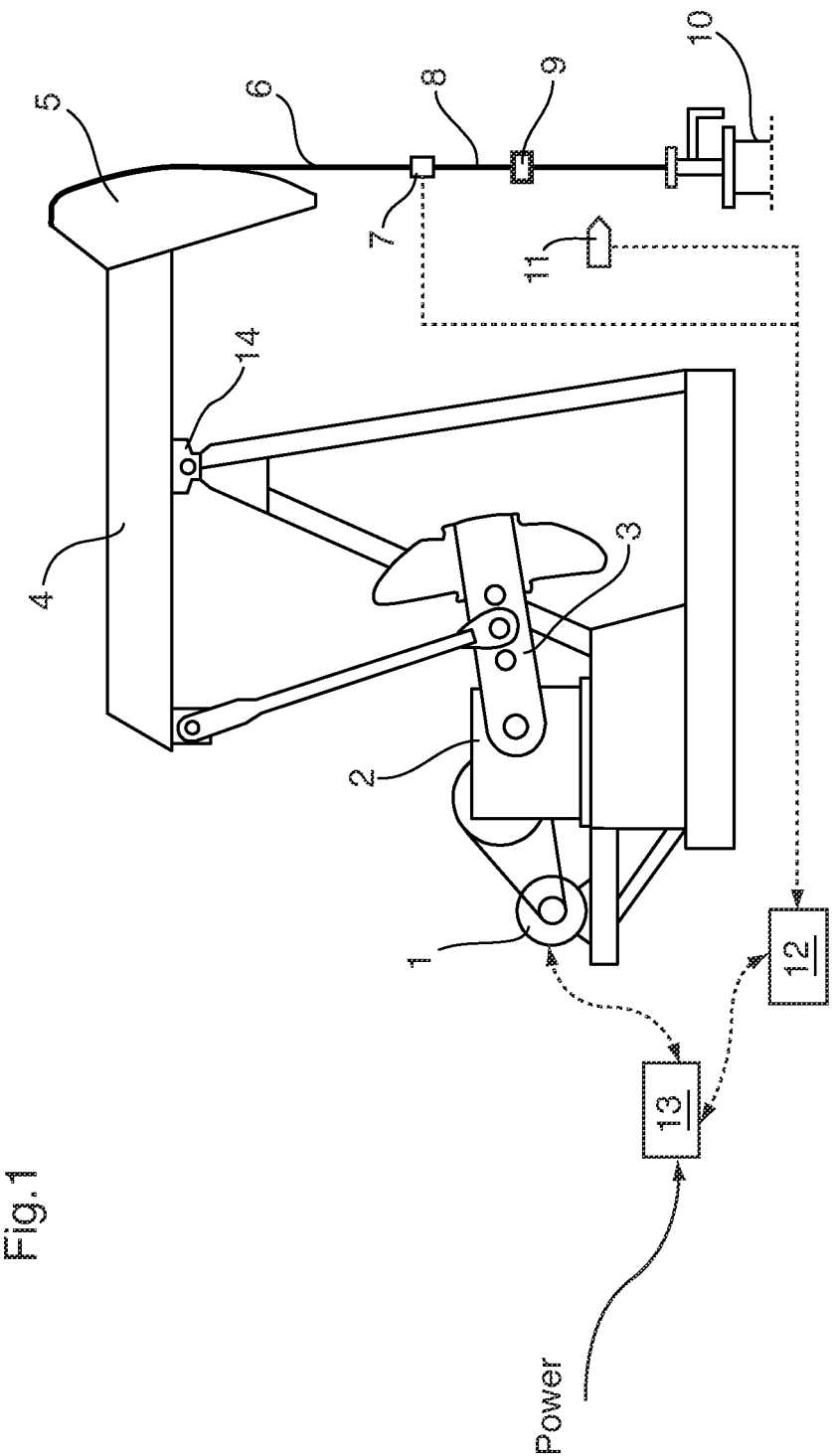
FIG. 1 is a schematic diagram of a reciprocating rod pumping system comprising a polished rod and provided with a polished rod position measurement system.

As noted above, the polished rod position in a reciprocating rod pumping system is utilized for a number of computations used in the operation and management of the pumping system. Polished rod position is described by the changes of the height of any selected point on the polished rod during a stroke, i.e. for a complete pumping cycle. Typically the position of the polished rod refers to the distance of any point on the polished rod from the lowest position of this point during the entire stroke, resulting in the polished rod bottom position being 0, and the top position being equal to the stroke length. A single stroke is typically defined as an upward movement from the bottom to the top, followed by the downward movement ending at the bottom position. However, stroke measurements for the surface card can start from any other initial position, and finish at the same position after completing a full cycle.

Accordingly, the embodiments described herein provide for a system and method for measuring polished rod position in a reciprocating rod pumping system, including:
- a self-calibrated measurement of the polished rod position at the start of a stroke; and
- determination of polished rod position during the entire stroke using the determined above start position and direct or indirect measurements of prime mover speed.

In particular, there is provided a system and a method for a determination of polished rod position at the start of the stroke with improved accuracy that is optionally carried out without prior calibration or effectively in a self-calibrating manner, without requiring external measurements or assistance from personnel. There is also provided a method for measuring polished rod position during the entire stroke based on the determined above polished rod position at the start of a stroke, using direct or indirect prime mover speed measurements. These embodiments are provided by a single sensor and sensing point that may be installed in an easily-accessible area of a well-site, with improved resistance to failure compared to previous solutions. These embodiments may be applied to any type of pumping unit, including walking beam and long-stroke units. Further, surface card measurements, namely the polished rod load and position as a function of time for the entire stroke, may be collected using these embodiments for use in computing the downhole card, diagnosing the pumping system performance, and controlling the pumping system. The system and method described herein may be implemented with a sensor system located away from rotating components of the pumping system's pumpjack, thus potentially reducing the injury risk factor for workers.

Furthermore, there is provided a method for measuring polished rod position during the entire stroke without special sensors for measuring the prime mover speed, which uses only the polished rod load measurements. This method can be applied to any system that is capable of determining the polished rod position at the start of the stroke, including the system described in this application.

There is accordingly provided a system for determining position of a polished rod of a reciprocating rod pumping system, the system comprising: a proximity sensor and a proximity sensor target adapted to detect passage, in two opposite directions, of a selected point on a reciprocally moving component of the reciprocating rod pumping system by a selected fixed location; and means adapted to determine from said detected passage in two opposite directions a position of said polished rod for at least one point of a stroke cycle.

In one aspect, the proximity sensor target is mounted at the selected point on the reciprocally moving component of the pumping system, and the proximity sensor is mounted at the selected fixed location.

In another aspect, the proximity sensor target comprises a magnetic target. Further, the proximity sensor may be a Hall effect sensor or magnetoresistive sensor.

In another aspect, the reciprocally moving component is the polished rod.

In a further aspect, the proximity sensor target is mounted on the polished rod and said proximity sensor is mounted at the selected fixed location, said selected fixed location being disposed between a bottom position and a top position of said target during a stroke of said pumping system.

In yet another aspect, the selected fixed location is in fixed relation to ground level. Further, in another aspect, the reciprocally moving component is a walking beam operably connected to the prime mover and the polished rod.

In still a further aspect, the proximity sensor target is mounted on the walking beam, and the proximity sensor is mounted at the selected fixed location on the pumpjack stationary structure.

In yet a further aspect, the proximity sensor and proximity sensor target adapted to detect passage of the selected point by the selected fixed location comprise means to measure a time of the said detected passage.

Still further, in an aspect the means adapted to determine the position of the polished rod is adapted to determine a time of the polished rod reaching a bottom position or a top position of the stroke cycle, said time being determined to be a midpoint in time between two consecutive passages of the selected point by the selected fixed location. The means adapted to determine the position of the polished rod may comprise means adapted to determine a motion of the prime mover during either an entire stroke cycle or a period during passage, in opposite directions, of the selected point by the selected fixed location. Further, the means adapted to determine the motion of the prime mover may comprise means adapted to measure prime mover speed, and the means adapted to determine the motion of the prime mover comprises means adapted to calculate prime mover speed. Still further, the means adapted to determine the position of said polished rod for at least one point of the stroke cycle may be adapted to determine the position of said polished rod at predetermined time intervals during the entire stroke cycle.

In another aspect, the detected passage of the selected point on the reciprocally moving component is so close to the top or bottom position of the polished rod that the detection of the said passage in the opposite directions is reduced to a single event.

In a further aspect, the means adapted to determine the position of said polished rod for at least one point of the stroke cycle is adapted to determine a crank rotation angle corresponding to said position of said polished rod.

There is also provided a method of determining position of a polished rod of a reciprocating rod pumping system, the method comprising: detecting passage in two opposite directions of a selected point of a reciprocally moving component of said pumping system by a selected fixed location; and determining from said detected passage in two opposite directions a position of said polished rod for at least one point of a stroke cycle.

In an aspect of the foregoing method, the reciprocally moving component is the polished rod. In a further aspect, the selected fixed location is in fixed relation to ground level. In yet another aspect, the reciprocally moving component is a walking beam operably connected to the prime mover and the polished rod.

In still a further aspect of the foregoing method, determining the position of the polished rod for at least one point of a stroke cycle comprises determining the polished rod position at a time of passage of the selected point by the fixed location. Still further, detecting said passage of the selected point comprises measuring a time of said passage.

In yet another aspect, the prime mover is a rotary motor, and determining the polished rod position $s_0$ at the time of passage of said selected point by said fixed location comprises: using a mathematical model of pumping unit geometry to determine polished rod position $s(r^{s_a})$ as a function of motor shaft revolutions $r^{s_a}$ occurring since the polished rod was at an arbitrarily selected reference position $s_a$; determining a number of motor revolutions r occurring between two passages in the opposite directions of said selected point by said fixed location; calculating two unknown number of motor revolutions $r_0^{s_a}$ and $r_1^{s_a}$ by solving the following set of two equations, the second one being generally non-linear:

$$r_1^{s_a} - r_0^{s_a} = r$$

$$s(r_0^{s_a}) = s(r_1^{s_a})$$

where
$r_0^{s_a}$ is the number of motor revolutions occurring since the polished rod was at the arbitrarily selected reference position $s_a$ till said selected point passed said fixed location in one direction, $r_1^{s_a}$ is the number of motor revolutions occurring since the polished rod was at the arbitrarily selected reference position $s_a$ till said selected point passed said fixed location in the opposite direction, $s(r_0^{s_a})$ is the polished rod position at the time of said selected point passing said fixed location in one direction, and $s(r_1^{s_a})$ is the polished rod position at the time of said selected point passing said fixed location in the opposite direction; and
assigning the value $s(r_0^{s_a}) = s(r_1^{s_a})$ to the polished rod position $s_0$ at the time of the passage of the said selected point by the said fixed location.

In another aspect, number of motor revolutions r between the two passages in the opposite directions of said selected point by said fixed location is calculated based on a motor speed $\Omega(\tau)$ between said passages using the following formula:

$$r = \frac{1}{60} \int_0^{t_1} \Omega(\tau) d\tau$$

where
$t_1$ is time elapsed between the passages of the selected point by the fixed location in two opposite directions and $\Omega(\tau)$ is motor speed [Rpm] at time $\tau$ [seconds] in the period between the passages of the fixed location in two opposite directions.

In another aspect, the motor speed $\Omega(\tau)$ is obtained from direct or indirect measurements.

In yet another aspect, the motor speed $\Omega$ is constant, the pumping system comprises a beam pumping unit with a crank, the arbitrarily selected reference position $s_a$ is at the polished rod lowest position, and the polished rod position $s_0$ at the time of passage of said selected point by said fixed location is calculated for the following value of the crank position, not dependent directly on the motor speed:

$$\theta_0 = \theta_{min} - \pi \frac{t_1}{T}$$

where
$\theta_{min}$ is crank angle corresponding to the lowest position of the polished rod, $t_1$ is time elapsed between the passages of the selected point by the fixed location in two opposite directions, and T—period of the stroke cycle.

In still a further aspect, determining the position of the polished rod for at least one point of a stroke cycle comprises determining the time of the polished rod passing its lowest position.

In another aspect, the middle time between the consecutive passages corresponds to approximately the lowest position of the polished rod.

In another aspect, the determining the position of said polished rod for at least one point of the stroke cycle comprises determining the position of said polished rod at predetermined time intervals during the entire stroke cycle.

In still a further aspect, determining said position of polished rod at predetermined time intervals during the entire stroke cycle comprises the following steps: determining polished rod position at a single time during a stroke; determining polished rod position at predetermined time intervals based on the motor speed during the entire stroke and the polished rod position at a single time during a stroke.

Still further, the polished rod position at a single time during a stroke is determined using the above-mentioned methods.

In a further aspect, the motor speed during the entire stroke is assumed constant.

Still further, the motor speed during the entire stroke is measured directly or indirectly.

In yet another aspect, said determining the position of said polished rod for at least one point of the stroke cycle comprises determining a crank rotation angle corresponding to said position of said polished rod.

There is also provided a method for determining polished rod position for an entire stroke cycle of a reciprocating rod pumping system, the pumping system comprising an electric motor and a means of converting the rotary motion of the motor shaft into a reciprocating motion of the polished rod, the method comprising: determining polished rod position at a selected start of the entire stroke cycle; obtaining polished rod load measurements for a number of time steps during the entire stroke cycle; calculating motor torque based on the polished rod load measurements thus obtained; calculating motor speed based on the calculated motor torque and motor specifications describing motor speed as a function of torque; and calculating polished rod position for the entire stroke cycle based on the polished rod position at a selected start of a stroke cycle and the motor speed during the cycle.

There is also provided that calculating motor torque based on the polished rod load measurements uses directly or indirectly the polished rod position, wherein the polished rod position is initially obtained for a constant motor speed and then rectified using the following iterative procedure: calculating motor torque based on a polished rod load and position for the entire cycle; calculating motor speed as a function of torque; calculating polished rod position based on the motor speed; and repeating all the steps above until a convergence is achieved.

In a further aspect, the convergence is achieved when changes of motor speed or torque between two iterations are below predetermined thresholds.

In still another aspect, calculating motor torque based on the polished rod load and position further uses a motor angular acceleration, wherein the motor angular acceleration is calculated from the motor speed.

In yet a further aspect, the polished rod position at a selected start of the stroke cycle is determined using the above-noted method.

Referring to FIG. 1, there is shown a reciprocating rod pumping system including a prime mover 1, gear reducer 2, a beam pumpjack with a crank 3 and a walking beam 4 ending with a horsehead 5. As is well understood by those skilled in the art, a purpose of these elements is to convert the prime mover motion (e.g. in terms of motor revolutions) into the reciprocating movement of the polished rod 8, here shown attached to the horsehead 5 with a wireline 6. The bottom of the polished rod 8 is connected to a sucker rod (not shown) inside a wellhead 10, the bottom of the sucker rod being attached to the plunger (not shown) of a downhole pump producing fluids from the well. A load cell 7 measures the force in the polished rod that varies during a stroke. As noted above, the system and method herein may be implemented with different types of reciprocating pumping systems employing a polished rod, using for example different types of pumpjacks such as the aforementioned beam pumping unit, which has the walking beam 4 and a crank attached to a gearbox output shaft, and long-stroke units in which a chain is driven by the sprocket attached to the gearbox output shaft. The various components of suitable pumping systems will be known to the skilled worker. The beam pumping unit illustrated in FIG. 1 is provided as only one implementation example, and is not intended to be limiting.

A position measurement system is provided for the polished rod, comprising a proximity sensor target 9 mounted on the polished rod 8 and a proximity sensor 11 installed at a fixed location close to the polished rod 8. Theoretically the locations of the sensor and the target can be switched, i.e. the sensor can be mounted on the polished rod, and the target mounted at a fixed location, but it would be less practical. In one embodiment, the target is made of a magnetic material and the sensor consists of a Hall effect, magnetoresistive or similar sensor in nature. It will be appreciated by those skilled in the art, however, that a number of other proximity sensors with accompanying targets can be used, including, but not limited to, optical, sonar, radar, capacitive, inductive, Eddy-current sensors or mechanical switches.

In one embodiment the proximity sensor target 9 is mounted around the circumference of the polished rod, and is advantageously provided in an annular configuration, such as a ring comprising one or more components, although other shapes can also be used. The one or more components may thus be distributed substantially evenly along the circumference of the annular target 9. In some embodiments, the target 9 may be provided in the form of a closed ring, and thus it is installed on the polished rod when the rod string is disassembled. In other embodiments, the target 9 is provided in one or more pieces that may be mounted around the circumference of the polished rod. A practical configuration consists of two pieces that can be easily bolted or otherwise fastened together around the polished rod so as to provide a tight (i.e., non-slip) fit around the rod. The target 9 may be fixed to a lower part of the polished rod so it is close to the wellhead 10 when the polished rod 8 is at the lowest position. Such a location for the target 9 provides easy access to it from the ground, and further limits the necessary height of the proximity sensor 11 described below.

The proximity sensor 11 is generally mounted so that is elevated above ground level, and at a level through which at least a portion of the length of the polished rod 8 passes during a stroke cycle. The sensor 11 can be installed on some fixture that is attached to the wellhead 10 or to the ground, for example proximate to the lowest position of the polished rod 8, e.g., at the height of a few centimeters above the proximity sensor target 9 when the polished rod is at its lowest position. The sensor 11 is positioned sufficiently close to the polished rod 8 such that it may detect when the proximity sensor target 9 passes by the sensor 11 during the course of a stroke cycle. Thus, it will be appreciated that by providing the target 9 in an annular form, any rotation of the polished rod 8 during operation of the pumpjack will not significantly affect the proximity detection capabilities of the sensor.

When the proximity sensor 11 detects the proximity of the corresponding target typically an electrical signal is generated. The sensor 11 may be connected by a wired connection (e.g., an electric cable) to a receiving device 12 such as a pump controller, a microprocessor or a computer. Alternatively, the sensor 11 may be provided with a wireless communication subsystem or external wireless communication module for wirelessly communicating with the receiving device 12, which in turn is provided with either a corresponding integrated or external wireless communication system. The selection of appropriate fixed or wireless communication hardware and software will be known to those skilled in the art. The sensor 11 thus communicates a detection indication to the receiving device 12 (for example, by means of an electrical signal, digital packet, or other suitable signal).

At the receiving device 12, the received detection indication or signal is assigned a detection time, based on a clock or timer provided at the receiving device. A set of those consecutive signals and their respective times of receipt are analyzed by the software or firmware in order to detect the time of characteristic points during a stroke.

Further, the position measurement system can include an optional torque or speed measurement device 13 for direct or indirect measurement of motor torque or speed. This device 13 can include a transducer for measuring motor electric current (proportional to the torque) or a variable frequency drive (VFD) that besides controlling motor speed provides information on the motor speed and/or torque.

Figure 2:
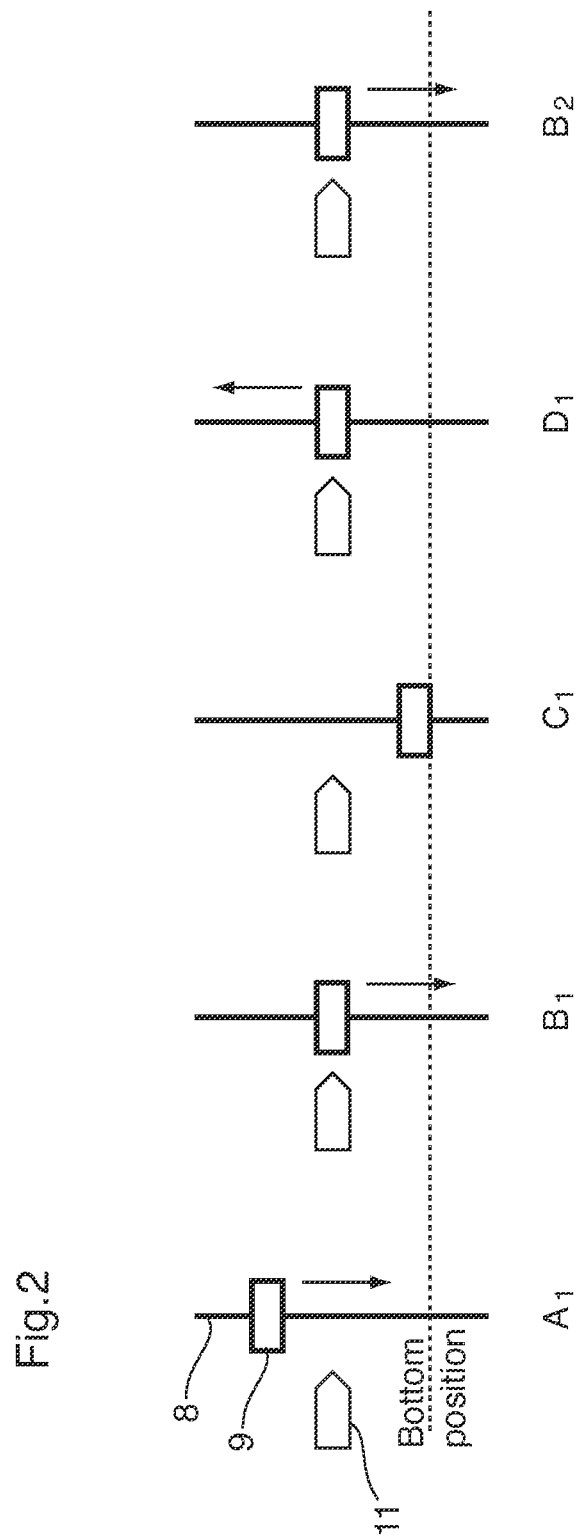
FIG. 2 is a diagram of relative positions of a proximity sensor target mounted on the polished rod and a proximity sensor mounted at a fixed location.
Figure 3:
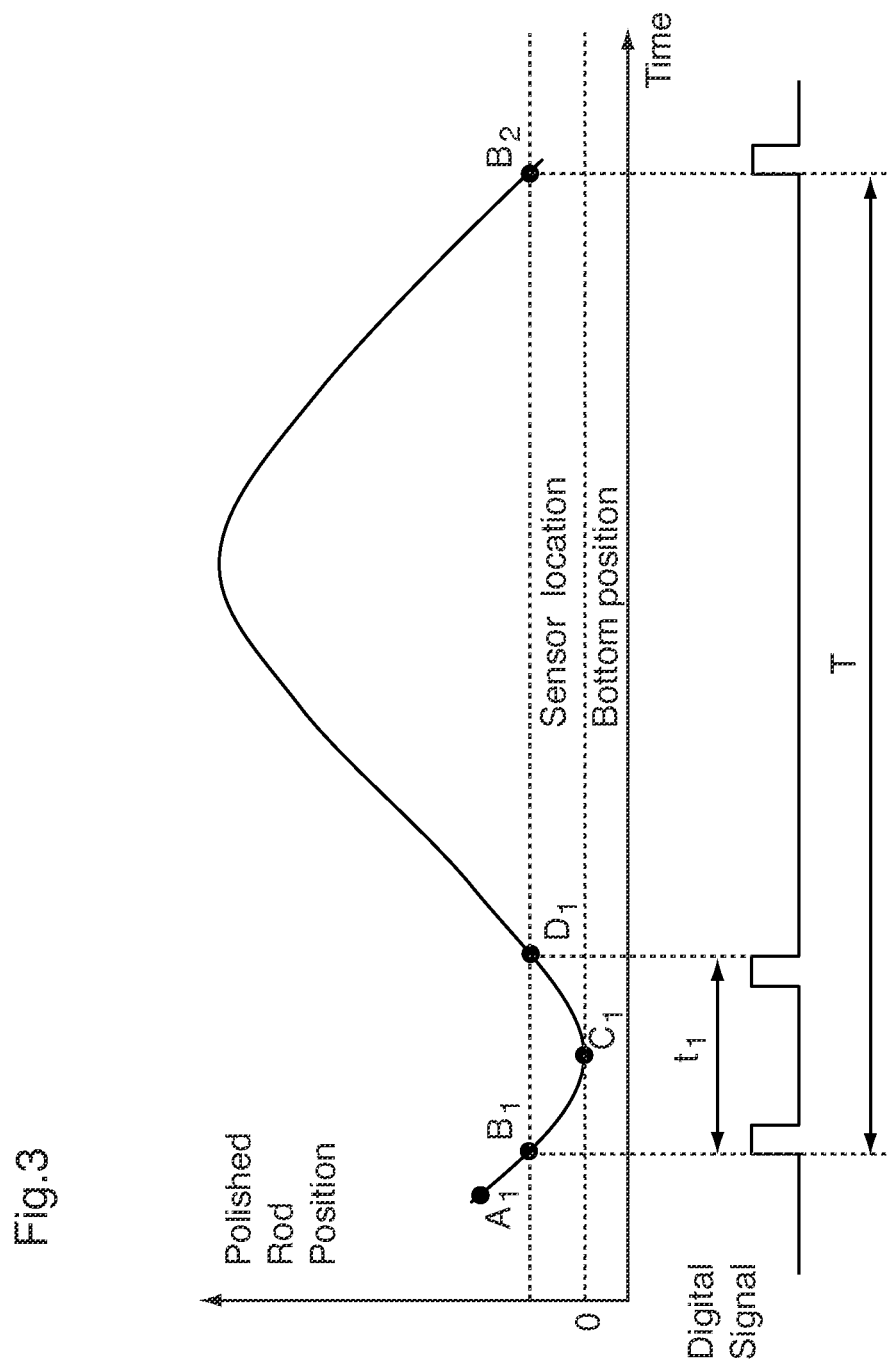
FIG. 3 is a graphical representation of polished rod position and proximity sensor signal as a function of time for a single stroke.

FIG. 2 shows the position of the proximity sensor target 9 with respect to the location of the proximity sensor 11 at a few critical positions during a stroke marked as A1, B1, C1, D1 and B2. The vertical arrow indicates the direction of the polished rod 8 movement. FIG. 3 shows the polished rod 8 position as a function of time for the entire stroke, with those critical positions marked at the corresponding times. It also shows a possible detection signal generated at the proximity sensor 11 for the entire stroke. As illustrated with reference to FIG. 2, during a single cycle the target 9 passes the sensor 11 twice: at a first time when the polished rod 8 is moving downwards (point B1), and then on the way back up (D1). The first detection signal generated by the passage of the magnet in the downward direction (B1) marks the start of the stroke. This first signal may trigger a data collection for the surface card at the receiving device 12 for the upcoming stroke. If data collection was carried out for a previous stroke, then this detection signal may also trigger termination of data collection for the previous stroke. Subsequently, the polished rod 8 comes to a transitory stop at its lowest position (C1) and then starts to move upwards. When the target 9 passes the sensor 11 on the way up, the final detection signal (D1) generated will correspond to the same position of the polished rod 8 as the first signal (B1) recorded on the way down. This fact, together with the measurements of the motor revolutions over time $t_1$ (FIG. 3) between points B1 and D1 may be used as the basis for determination of the polished rod 8 position at this location. The next detection of this location by the sensor 11 will take place at point B2 after reaching the polished rod 8 top position and reversing its movement direction to downward again. The time elapsed between positions B1 and B2 will thus correspond to the period T of a single stroke, shown in FIG. 3. If, however, the target 9 and sensor 11 are positioned so as to detect the passage of the polished rod at or near the top or bottom of the polished rod during a cycle, the first detection signal and the second detection signal may be so close in time so as to be considered a single event.

In a further embodiment, a target 9 may be mounted on another point on another reciprocally moving component of the pumpjack that is capable of passing a fixed-position sensor twice during a single stroke (i.e., once during the downstroke and once during the upstroke), this other point effectively corresponding to a given position of the polished rod. For example, the target 9 may be mounted on the walking beam 4, advantageously located proximate to the walking beam's central bearing 14 so that the corresponding sensor can be attached to the fixed part of the pumpjack structure in proximity of the central bearing. If the proximity sensor and the corresponding target are mounted in such a way that the detected polished rod position is close to the top position, then the sensor would detect the corresponding target on the way up first, and then on the way down.

The process of determining the polished rod 8 position at the time of the passage of the selected fixed location (B1, D1 or B2) may involve the following steps:

1. Obtaining, using the proximity sensor 11, the time of the first digital signal (B1) during the downward movement of the polished rod, and the last signal (D1) on the way up.
2. Determining motor speed between B1 and D1 as well as during the entire stroke.
3. Determining the polished rod position as a function of the motor speed and elapsed time.
4. Calculating the distance traveled by the polished rod between points B1 and C1 as well as C1 and D1.

For this last step, the distance traveled may be calculated using the following information:
   points B1, C1 and D1 correspond to the same polished rod position; and
   the motor revolutions between B1 and D1 are known from steps 1 and 2.

The distance calculated in step 4 provides the position of the polished rod 8 above its lowest position at the time of the target 9 passing the proximity sensor 11.

This position can be also expressed in terms of the corresponding rotation angle of the gearbox output shaft of the pumping system. For beam pumping units this angle is the same as the crank position, therefore for the sake of brevity the term "crank position" is used to describe this angle. It will be appreciated, though, that in some pumping units, such as a long-stroke unit, an actual crank may not be present; thus, the term "crank position" includes the corresponding rotation angle of the gearbox output shaft. In addition, the time at which the polished rod 8 is at its lowest position (i.e., equal to 0) may also be computed from the information obtained using this method. This time can also be calculated approximately as the midpoint value between the time of the first digital signal and the time of the last digital signal during the downward movement and upward movement of the polished rod, respectively. Similarly, in case when the proximity sensor and the corresponding target are mounted close to the polished rod top position then the time at which the polished rod 8 is at its highest position can be approximated as the midpoint time between the time of the first digital signal during the upward movement and the time of the last digital signal during the downward movement of the cycle. Such an approximation does not require any information about the motor speed.

Similar four steps may be implemented to obtain the polished rod 8 position during the entire stroke for the purpose of collecting surface card data. Since the location of the proximity sensor 11 and the target 9 are fixed, the polished rod position at which the detection signal is generated will be substantially the same for every stroke. Also the same will be the number of motor revolutions between the first (B1) and last (D1) signal generated during the polished rod downstroke and upstroke movement, respectively. Thus, it may not be necessary to record and analyze all the detection signals for every stroke of the pumping system; only the start, B1, of each stroke needs to be determined, as all other required data may be obtained during a calibration run. However, the option of recording both the first B1 and the last D1 digital signal for each stroke, without using any calibration run, is also available.

A more detailed description of those four steps is provided below:

Analysis of Time-Stamped Sensor Data

As a first step, the proximity sensor 11 is used to obtain the time of the first detection signal at position B1 during the downward portion of the polished rod movement, and the last detection signal at D1 on the way up for the same stroke. The next signal detected during the next downward movement of the polished rod (B2) marks the end of the current stroke and the start of the next stroke. These detection signals are time-stamped at the receiving device 12.

Determination of Motor Speed

For most accurate polished rod position measurements the motor speed between B1 and D1, as well as for the entire stroke, is determined. When using a VFD for controlling the motor speed the motor speed information may be obtained directly from the VFD. If a VFD is not used, then a rotary encoder mounted on the motor shaft can be used to measure the motor speed. A further method of determination of the motor speed that does not require the use of the VFD or rotary encoder is described below.

First, the approximate polished rod position is computed from the approximate motor speed using the procedure described below under the heading of "Determination of polished rod position based on motor speed", based on the assumption that the motor speed is constant (equal to the nominal rpm), which is a reasonable initial approximation for motors not controlled by VFD. Based on this approximate polished rod position (and the measured polished rod load), the motor torque may be calculated and subsequently used for calculation of the rectified motor speed. This new motor speed is no longer constant, and can be used to calculate an improved polished rod position, which in turn can be used to calculate a more accurate motor torque. This procedure can be repeated till a convergence of the polished rod position (or motor speed) is achieved, which usually takes only a couple of iterations.

Determination of Polished Rod Position Based on Motor Speed

This step uses a mathematical model describing the relationship between the motor speed and the polished rod position for any point during the stroke, i.e. for any position of the polished rod or the corresponding crank angle. This model comprises the mathematical relationship between the polished rod and crank position resulting from the pumpjack geometry, as well as calculation of the reduction ratio R between the motor speed and the gearbox output speed, i.e. crank angular speed. The reduction ratio R is the net result of the gearbox reduction ratio, belt slippage and the reduction ratio resulting from the sizes of the sheaves used on the motor shaft, gearbox input shaft and jackshafts (if present). Knowing the reduction ratio R and the instantaneous motor speed $\Omega$ for the entire stroke we can calculate the crank angle $\theta$ at any time t using the following formula:

$$\theta(t) = \theta_0 + \frac{2\pi}{R}r(t) \quad (1)$$

where t is a time elapsed since the start of the stroke in seconds; $\theta_0$ is a crank angle at the start of the stroke in radians; and r(t) is a number of motor shaft revolutions from the start of the stroke, equal to $$r(t) = \frac{1}{60}\int_0^t \Omega(\tau)d\tau \quad (2)$$

where $\Omega(\tau)$ is motor speed in revolutions per minute [Rpm] at time $\tau$ in seconds.

The reduction ratio R often changes over time, mainly due to the belts slippage that is affected by changes in humidity, temperature and load. For at least this reason, the theoretical reduction ratio calculated based on the gearbox nominal reduction ratio and sheave diameters is not accurate enough to produce such a change of the crank angle at the end of the stroke that corresponds to a full cycle. For the beam pumping unit this angle should be equal to $2\pi$, and for long-stroke units should be further multiplied by the chain reduction ratio c. Therefore, the detection of the end of the current stroke at time T (stroke period in seconds) can be used to calculate the actual reduction ratio using the following formula:

$$R = \frac{r(T)}{c} \quad (3)$$

where r(T) is a number of motor shaft revolutions during the entire pumping cycle as per Eq. (2); c=1 for beam pumping units and $$c = \frac{L_C}{\pi D_S}$$

for long-stroke units, where $L_c$ is chain length and $D_s$ is sprocket diameter.

The number of motor shaft revolutions $R_T$ during a pumping cycle is called the total reduction ratio, and according to Eq. (3) is equal to $R_T = r(T) = Rc$. For beam pumping units, since c=1, the total reduction ratio is the same as the reduction ratio R.

Substituting Eq. (3) into Eq. (1), the following formula expresses the crank angle as a function of time t:

$$\theta(t) = \theta_0 + \frac{2\pi c}{R_T}r(t) \quad (4)$$

If a simplistic assumption is made that the motor speed is constant during the entire stroke (and equal to the nominal Rpm) then Eqs. (4) and (2) produce the following simple formula for the crank angle as a function of time:

$$\theta(t) = \theta_0 + 2\pi c \frac{t}{T} \quad (5)$$

The actual value of the motor nominal Rpm is not used in the above formula, only the stroke time T, therefore there is no need to measure the motor speed in this case.

For a long-stroke unit the "crank position" refers to the sprocket angular position, i.e. gearbox output shaft rotation angle. It can be easily converted to the chain position C(t) which transforms Eqs. (4) and (5) into the following formulas:

$$C(t) = C_0 + \frac{L_C}{R_T}r(t) \quad (6)$$

or $$C(t) = C_0 + L_C\frac{t}{T} \text{ - for constant motor speed} \quad (7)$$

where $C_0$ is chain position at the start of the pumping cycle.

In order to calculate crank angle over the entire stroke using Eq. (1) or any of the other equations derived so far, the crank angle $\theta_0$ at the beginning of the stroke and the motor speed for the entire stroke are needed. The methods of obtaining the motor speed were discussed in step 2 above ("Determination of motor speed"). The procedure for obtaining the crank angle is described below.

For any given crank angle $\theta$ (from 0 to $2\pi$) the corresponding polished rod position s(t) can be calculated based on the pumpjack kinematic model; therefore, having calculated the crank angle from Eq. (1) for the entire stroke, the person skilled in the art may further obtain the corresponding polished rod position.

Calculating the Distance Traveled by the Polished Rod

The distance traveled by the polished rod between the first and last digital signals (triggered by the proximity sensor target 9 passing the proximity sensor 11 during the downward and upward movement) will be calculated based on the crank rotation over that time, which can be obtained from the motor speed as was demonstrated above.

Time t is set to $t_0=0$ at the stroke start that corresponds to the first digital signal generated by the proximity sensor during the downward movement of the polished rod. The time of the last digital signal on the way up is denoted as $t_1$. According to Eq. (1) the crank rotation angle $\Delta\theta$ during this time is equal to:

$$\Delta\theta = \frac{2\pi}{R}r(t_1) \quad (8)$$

which, after substituting Eq. (3) for the reduction ratio R, assumes the following form:

$$\Delta\theta = \frac{2\pi c}{r(T)}r(t_1) \quad (9)$$

When the motor speed is constant then the above equation simplifies to:

$$\Delta\theta = 2\pi c \frac{t_1}{T} \quad (10)$$

During this period the polished rod 8 travels downward a certain distance $s_0$ until it reaches the lowest position. The rod

8 then travels the same distance upward till it reaches the last detection signal recorded by the proximity sensor 11. Due to a large degree of geometric symmetry over fairly small distance traveled by the polished rod 8 (and therefore the crank) the crank rotation angle on the way down is substantially close to the crank rotation angle on the way up, and each of these rotation angles is substantially equal to half of the angle $\Delta\theta$. Based on the pumpjack's kinematic model, the crank position $\theta_{min}$ that corresponds to the lowest position of the polished rod may be computed. This position may then be used to determine the crank position at the start of the stroke (at the proximity sensor first digital signal on the way down) as follows:

$$\theta_0 = \theta_{min} - \mu\Delta\theta/2 \tag{11}$$

where $\mu$ is either +1 or −1 depending on the direction of the crank rotation (+1 if the crank angle $\theta$ increases during the stroke, and −1 if the crank angle decreases).

Now the polished rod position $s_0$ may be computed for the start of the stroke by converting the crank angle $\theta_0$ to the corresponding polished rod position using the kinematic model of the pumpjack. Due to the symmetry of function s with respect to $\Delta\theta$ the polished rod position at the start of the stroke can be calculated for any sign of value $\Delta\theta$, therefore combining Eqs. (10-11) it can be calculated for the following value of the crank position:

$$\theta_0 = \theta_{min} - \pi c \frac{t_1}{T} \tag{12}$$

If the proximity sensor 11's first detection signal occurs at a significant distance away from the lowest position of the polished rod, and if in addition the pumpjack has a significant asymmetry at this point, then the above assumption about the substantially equal crank rotation angle from the lowest polished rod position to both of the detection signals may not be completely accurate. In this case, using the pumpjack kinematic model, the person skilled in the art may calculate for a given crank rotation angle $\Delta\theta$ the values of such crank positions $\theta_0$ and $\theta_1$ during the downstroke and upstroke, correspondingly, that their difference is equal to $\Delta\theta$:

$$\Delta\theta = |\theta_0 - \theta_1|$$

and the polished rod position is the same:

$$s(\theta_0) = s(\theta_1). \tag{13}$$

In order to implement this in a mathematical algorithm the crank position $\theta_0(s)$ during downstroke and $\theta_1(s)$ during upstroke may be calculated as a function of the polished rod position s to provide the following function:

$$\Delta\theta(s) = |\theta_0(s) - \Delta\theta_1(s)| \tag{14}$$

Thus, the value of $s_0$ may be computed utilizing the condition that the value of the function $\Delta\theta(s_0)$ is equal to the value $\Delta\theta$ obtained from the measurements (using any of the Eqs. (8-10)), and subsequently this value of $s_0$ can be used to calculate the required crank position $\theta_0(s_0)$ at the start of the pumping cycle. Following the above methodology as one example, the polished rod position and the corresponding crank position at the start of the stroke can be computed for any given physical location of the proximity sensor 11.

The described above method of calculation of the polished rod start position $s_0$ can be generalized using the following steps:

use a mathematical model of pumping unit geometry to determine polished rod position $s(r^{s_a})$ as a function of motor shaft revolutions $r^{s_a}$ occurring since the polished rod was at an arbitrarily selected reference position $s_a$;

determine a number of motor revolutions r occurring between the first and last digital signals triggered by the proximity sensor target passing the proximity sensor during the downward and upward movement;

calculate two unknown number of motor revolutions $r_0^{s_a}$ and $r_1^{s_a}$ by solving the following set of two equations, the second one being generally non-linear:

$$r_1^{s_a} - r_0^{s_a} = r$$

$$s(r_0^{s_a}) = s(r_1^{s_a})$$

where $r_0^{s_a}$ is the number of motor revolutions occurring since the polished rod was at the arbitrarily selected reference position $s_a$ till the first digital signal was triggered, $r_1^{s_a}$ is the number of motor revolutions occurring since the polished rod passed the arbitrarily selected reference position $s_a$ till the last digital signal was triggered $s(r_0^{s_a})$ is the polished rod position at the time of the first digital signal, and $s(r_1^{s_a})$ is the polished rod position at the time of the last digital signal; and assign the value $s(r_0^{s_a}) = s(r_1^{s_a})$ to the polished rod position $s_0$ at the start of the stroke time.

Other reference points may be used for the position calculation. Using Eq. (1), the crank position (and therefore the polished rod position) can be calculated at any time during the stroke. Using this very same relationship between the time and position the time during the stroke when the polished rod or crank reaches a given position that may be of interest, e.g. the lowest position of the polished rod, can be computed.

The proximity sensor's first digital signal is not the only time reference that can be used for position calculation. Another reference point that can be more convenient in some applications is the lowest position of the polished rod 8. This happens about at the mid-time between the detection signals obtained when the polished rod 8 travels down and up, therefore the approximate time $t_{min}$ of reaching the lowest polished rod position 8 can be simply calculated as $$t_{min} = t_1/2 \tag{15}$$

This value is very accurate when $t_1$ is relatively small (i.e. the times of the detection signals are close together) or the motor speed is constant between the detection signals.

Therefore, instead of calculating $\theta_0$ and using Eq. (1) to determine the crank position (and subsequently the polished rod position) at any time t during the cycle, the following formula utilizing the value of $\theta_{min}$ of the crank position corresponding to the lowest polished rod position, and the time $t_{min}$ of reaching this position, may be used:

$$\theta(t) = \theta_{min} + \frac{2\pi}{R}\Delta r(t_{min}, t) \tag{16}$$

where $\Delta r(t_{min}, t)$ is the number of motor shaft revolutions between time $t_{min}$ and t, equal to $$\Delta r(t_{min}, t) = r(t) - r(t_{min}) \tag{17}$$

which according to Eq. (2) can be also expressed as:

$$\Delta r(t_{min}, t) = \frac{1}{60}\int_{t_{min}}^{t} \Omega(\tau)d\tau \quad (18)$$

The described above system can also be used for determination of the position of any other point during a stroke that could be used as an alternative starting point of a stroke. If an alternative sensor system for detection of the starting position was used, then this starting position could be measured during a calibration using the measurement system described in this application. After the calibration, the measurement system could be removed from the pumping system.

For example if the stroke start is triggered by a sensor detecting the passage of the crank arm at a certain crank position, then by recording the time $t_c$ of this event the crank position $\theta_c = \theta(t_c)$ (and the corresponding polished rod position) can be calculated, using for example Eq. (1) or (16). This point can then be used to calculate the crank (and polished rod) position of any point during the cycle using for example the formula similar to Eq. (16):

$$\theta(t) = \theta_c + \frac{2\pi}{R}\Delta r(t_c, t) \quad (19)$$

An Alternate Method of Determining the Motor Speed

The methods described so far generally require the information on motor speed. A new method is proposed for determination of the motor speed and polished rod position for the entire stroke that does not require any measurements besides the polished rod load measurements as a function of time. This method eliminates the need to use additional sensors, such as encoders, when the motor is not controlled by a VFD and the motor's speed is therefore not available from a VFD. This method can be substituted for the determination of the motor speed using the VFD or rotary encoder in the foregoing methods for determining polished rod position at the start of the stroke. This alternate method can be also used for calculation of the polished rod position for the entire stroke once the polished rod position at the start of the stroke is obtained, whether by means of the system and methods described herein, or by another system or method.

In this method, the polished rod load measurements obtained for different times during the stroke are used for calculation of the motor torque. The motor torque is then used for calculation of the motor speed by utilizing the motor characteristics provided by a manufacturer, and in particular the relationship between the motor torque and the speed (or more often the motor slip instead of the speed, which is defined as the deviation of the motor speed from the nominal speed). The motor torque can be calculated from the polished rod load using, for example, formulas published in Takacs, *Modern Sucker-Rod Pumping* or Gibbs, "Computing Gearbox Torque and Motor Loading For Beam Pumping Units with Consideration of Inertia Effects", SPE 5149. These formulas include the inertial effects of the angular acceleration of the rotating elements of the pumpjack, taking into account scenarios where the motor speed is not constant. The angular acceleration is calculated based on the first derivative of motor speed with respect to time. However, these calculations require not only the polished rod load but also the polished rod position that is initially not known; therefore, an iterative approach is used to calculate the polished rod position, followed by the motor torque (and speed) calculations. The initial polished rod position is obtained for a constant motor speed. The iterative procedure comprises the following steps:

calculating motor torque based on the polished rod load and position for the entire cycle;
calculating motor speed as a function of torque; and
calculating polished rod position for the entire stroke cycle based on its position at a given start of the stroke cycle and the motor speed during the cycle.

This process is repeated using the polished rod position thus calculated. The iterations are repeated until the convergence of the motor torque or speed is achieved, for example when changes of motor speed or torque between two iterations of this method are less than a predetermined threshold, such as 1 percent of the current value or value of a previous iteration.

The foregoing computation of polished rod position may be used to determine the position of the polished rod at predetermined time intervals during the entire stroke cycle, and may also be used as controller input to control the operation of pumping units installed on hydrocarbon producing wells, for example for pump-off-controllers or variable speed controllers equipped with a variable frequency drive.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

Any computer components, software modules, functions and data structures described or utilized herein may be connected directly or indirectly to each other in order to allow the flow of data needed for their operations. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

The invention claimed is:

1. A system for determining position of a polished rod of a reciprocating rod pumping system having a prime mover driving reciprocating motion of the polished rod using one or more components transferring prime mover motion to the polished rod, the reciprocating motion of the polished rod comprising a stroke cycle, the system comprising:
  a proximity sensor and a proximity sensor target, one of the proximity sensor and the proximity sensor target being mountable on a selected point on a reciprocally moving component of the reciprocating rod pumping system and the other of the proximity sensor and the proximity sensor target being mountable on a corresponding selected fixed location, the proximity sensor being configured to transmit a detection signal on detection of the proximity sensor target, the reciprocally moving component comprising the polished rod or one of the one or more components; and
  a receiving system configured to receive a plurality of detection signals form the proximity sensor, the plurality of detection signals comprising a detection signal resulting from detection of the proximity sensor target during a downstroke portion of the stroke cycle and a detection signal resulting from detection of the proximity sensor target during an upstroke portion of the stroke cycle,
  the receiving system further being configured to determine a time of each of the plurality of detection signals, and to determine from said times a position of said polished rod for at least one point of the stroke cycle.

2. The system of claim 1, wherein the proximity sensor target is provided at the selected point on the reciprocally moving component of the pumping system, and the proximity sensor is provided at the selected fixed location.

3. The system of claim 1, wherein the proximity sensor target comprises a magnetic target.

4. The system of claim 3, wherein the proximity sensor comprises a Hall effect sensor or magnetoresistive sensor.

5. The system of claim 1, wherein the reciprocally moving component is the polished rod.

6. The system of claim 5, wherein said proximity sensor target is provided on the polished rod and said proximity sensor is provided at the selected fixed location, said selected fixed location being disposed between a bottom position and a top position of said target during the stroke cycle.

7. The system of claim 1, wherein the selected fixed location is in fixed relation to ground level.

8. The system of claim 1, wherein the reciprocally moving component is a walking beam operably connected to the prime mover and the polished rod.

9. The system of claim 8, wherein said proximity sensor target is provided on the walking beam, and said proximity sensor is provided at the selected fixed location on a stationary structure of the reciprocating rod pumping system.

10. The system of claim 1, wherein the receiving system is configured to determine the position of the polished rod by determining a time of the polished rod reaching a bottom position or a top position of the stroke cycle, said time being determined to be a midpoint in time between two consecutive passages of the selected point by the selected fixed location.

11. The system of claim 1, wherein the receiving system is configured to determine the position of the polished rod by determining a motion of the prime mover during either an entire stroke cycle or a period during passage of the selected point by the selected fixed location during the downstroke and upstroke portions of the stroke cycle.

12. The system of claim 11, wherein the receiving system is configured to determine the motion of the prime mover by either measuring prime mover speed or calculating prime mover speed.

13. The system of claim 1, wherein the receiving system is configured to determine the position of said polished rod at predetermined time intervals during the entire stroke cycle.

14. The system of claim 1, wherein the detected passage of the selected point on the reciprocally moving component is so close to the top or bottom position of the polished rod that the detection of the said passage during the downstroke and upstroke portions of the stroke cycle are reduced to a single event.

15. The system of claim 1, wherein the receiving system is configured to determine a crank rotation angle corresponding to said position of said polished rod.

16. A method of determining position of a polished rod of a reciprocating rod pumping system having a prime mover driving reciprocating motion of the polished rod using one or more components transferring prime mover motion to the polished rod, the reciprocating motion of the polished rod comprising a stroke cycle, the method comprising:
  detecting, by a proximity sensor, a proximity sensor target during a downstroke portion of the stroke cycle and transmitting a first detection signal to a receiving system in response to the detecting, one of the proximity sensor and the proximity sensor target being provided on a selected point on a reciprocally moving component of the reciprocating rod pumping system and the other of the proximity sensor and the proximity sensor target being provided on a corresponding selected fixed location, the reciprocally moving component comprising the polished rod or one of the one or more components;
  detecting, by the proximity sensor, the proximity sensor target during an upstroke portion of the stroke cycle and transmitting a second detection signal to the receiving system in response to the detecting;
  receiving, by the receiving system, a plurality of detection signals including the first detection signal and the second detection signal;
  determining, by the receiving system, a time of each of the plurality of detection signals, and to determine a position of said polished rod for at least one point of the stroke cycle.

17. The method of claim 16, wherein the reciprocally moving component is the polished rod.

18. The method of claim 16, wherein the selected fixed location is in fixed relation to ground level.

19. The method of claim 16, wherein the reciprocally moving component is a walking beam operably connected to the prime mover and the polished rod.

20. The method of claim 16, wherein determining the position of the polished rod for at least one point of the stroke cycle comprises determining the polished rod position at a time of passage of the selected point by the fixed location.

21. The method of claim 20, wherein the prime mover is a rotary motor, and determining the polished rod position at the time of passage of said selected point of the reciprocally moving component by said fixed location comprises:
  using a mathematical model of pumping unit geometry to determine polished rod position $s(r^{s_a})$ as a function of motor shaft revolutions $r^{s_a}$ occurring since the polished rod was at an arbitrarily selected reference position $s_a$;
  determining a number of motor revolutions $r$ occurring between two passages in the of said selected point by said fixed location during the downstroke portion and upstroke portion of the stroke cycle;

calculating two unknown number of motor revolutions $r_0^{s_a}$ and $r_1^{s_a}$ by solving the following set of two equations, the second one being generally non-linear:

$$r_1^{s_a} - r_0^{s_a} = r$$

$$s(r_0^{s_a}) = s(r_1^{s_a})$$

where $r_0^{s_a}$ is the number of motor revolutions occurring since the polished rod was at the arbitrarily selected reference position $s_a$ till said selected point passed said fixed location in one direction during the stroke cycle, $r_1^{s_a}$ is the number of motor revolutions occurring since the polished rod was at the arbitrarily selected reference position $s_a$ till said selected point passed said fixed location in the opposite direction during the stroke cycle, $s(r_0^{s_a})$ is the polished rod position at the time of said selected point passing said fixed location in the one direction, and $s(r_1^{s_a})$ is the polished rod position at the time of said selected point passing said fixed location in the opposite direction; and assigning the value $s(r_0^{s_a}) = s(r_1^{s_a})$ to the polished rod position at the time of the passage of the said selected point by the said fixed location.

22. The method of claim 21, wherein the number of motor revolutions r between the two passages during the downstroke portion and upstroke portion of the stroke cycle said selected point by said fixed location is calculated based on a motor speed $\Omega(\tau)$ between said passages using the following formula:

$$r = \frac{1}{60} \int_0^{t_1} \Omega(\tau) d\tau$$

where $t_1$ is time elapsed between the passages of the selected point by the fixed location in the downstroke portion and upstroke portion of the stroke cycle, and $\Omega(\tau)$ is motor speed [Rpm] at time $\tau$ [seconds] in the period between the passages of the fixed location in the downstroke portion and upstroke portion of the stroke cycle.

23. The method of claim 22, wherein the motor speed $\Omega(\tau)$ is obtained from direct or indirect measurements.

24. The method of claim 21, wherein the motor speed $\Omega$ is constant, the pumping system comprises a beam pumping unit with a crank, the arbitrarily selected reference position $s_a$ is at the polished rod lowest position, and the polished rod position $s_a$ at the time of passage of said selected point by said fixed location is calculated for the following value of the crank position, not dependent directly on the motor speed:

$$\theta_0 = \theta_{min} - \pi \frac{t_1}{T}$$

where $\theta_{min}$ is crank angle corresponding to the lowest position of the polished rod, $t_1$ is time elapsed between the passages of the selected point by the fixed location in the downstroke portion and upstroke portion of the stroke cycle, and T is period of the stroke cycle.

25. The method of claim 16, wherein determining the position of the polished rod for at least one point of the stroke cycle comprises determining the time of the polished rod passing its lowest position.

26. The method of claim 16, wherein a middle time between the consecutive passages corresponds to approximately the lowest position of the polished rod.

27. The method of claim 16, wherein said determining the position of said polished rod for at least one point of the stroke cycle comprises determining the position of said polished rod at predetermined time intervals during the entire stroke cycle.

28. The method of claim 27, wherein determining said position of polished rod at predetermined time intervals during the entire stroke cycle comprises:

determining polished rod position at a single time during the stroke cycle; and determining polished rod position at predetermined time intervals based on the motor speed during the entire stroke cycle and the polished rod position at a single time during the stroke cycle.

29. The method of claim 28, wherein the prime mover is a rotary motor, and wherein the polished rod position at a single time during the stroke cycle comprises determining the polished rod position $s_0$ at the time of passage of said selected point of the reciprocally moving component by said fixed location by:

using a mathematical model of pumping unit geometry to determine polished rod position $s(r^{s_a})$ as a function of motor shaft revolutions $r^{s_a}$ occurring since the polished rod was at an arbitrarily selected reference position $s_a$;

determining a number of motor revolutions r occurring between two passages in the downstroke portion and the upstroke portion of said selected point by said fixed location;

calculating two unknown number of motor revolutions $r_0^{s_a}$ and $r_1^{s_a}$ by solving the following set of two equations, the second one being generally non-linear:

$$r_1^{s_a} - r_0^{s_a} = r$$

$$s(r_0^{s_a}) = s(r_1^{s_a})$$

where $r_0^{s_a}$ is the number of motor revolutions occurring since the polished rod was at the arbitrarily selected reference position $s_a$ till said selected point passed said fixed location in one direction during the stroke cycle, $r_1^{s_a}$ is the number of motor revolutions occurring since the polished rod was at the arbitrarily selected reference position $s_a$ till said selected point passed said fixed location in the opposite direction during the stroke cycle, $s(r_0^{s_a})$ is the polished rod position at the time of said selected point passing said fixed location in the one direction, and $s(r_1^{s_a})$ is the polished rod position at the time of said selected point passing said fixed location in the opposite direction; and assigning the value $s(r_0^{s_a}) = s(r_1^{s_a})$ to the polished rod position $s_0$ at the time of the passage of the said selected point by the said fixed location.

30. The method of claim 28, wherein the motor speed during the entire stroke is either:
- assumed constant; or
- measured directly or indirectly.

31. The method of claim 16, wherein said determining the position of said polished rod for at least one point of the stroke cycle comprises determining a crank rotation angle corresponding to said position of said polished rod.

32. A method for determining polished rod position for an entire stroke cycle of a reciprocating rod pumping system, the pumping system comprising an electric motor inducing reciprocating motion of the polished rod, the method comprising:
- determining polished rod position at a selected start of the entire stroke cycle, the determining comprising:
  - detecting passage in two opposite directions of a selected point of a reciprocally moving component of said pumping system by a selected fixed location; and
  - determining from said detected passage in two opposite directions a position of said polished rod for at least one point of a stroke cycle;
- obtaining polished rod load measurements for a number of time steps during the entire stroke cycle;
- calculating motor torque based on the polished rod load measurements thus obtained;
- calculating motor speed based on the calculated motor torque and motor specifications describing motor speed as a function of torque; and
- calculating polished rod position for the entire stroke cycle based on the polished rod position at a selected start of a stroke cycle and the motor speed during the cycle.

33. The method of claim 32, wherein calculating motor torque based on the polished rod load measurements uses directly or indirectly the polished rod position, wherein the polished rod position is initially obtained for a constant motor speed and then rectified using the following iterative procedure:
- calculating motor torque based on a polished rod load and position for the entire cycle;
- calculating motor speed as a function of torque;
- calculating polished rod position based on the motor speed; and
- repeating all the steps above until a convergence is achieved.

34. The method of claim 32, wherein the convergence is achieved when changes of motor speed or torque between two iterations are below predetermined thresholds.

35. The method of claim 33, wherein calculating motor torque based on the polished rod load and position further uses a motor angular acceleration, wherein the motor angular acceleration is calculated from the motor speed.

36. The method of claim 32, wherein detecting passage in two opposite directions of a selected point of the reciprocally moving component comprises a proximity sensor detecting a proximity sensor target during passage of the proximity sensor target on a downstroke portion and an upstroke portion of the stroke cycle, one of the proximity sensor and the proximity sensor target being provided on a selected point on a reciprocally moving component of the reciprocating rod pumping system and the other of the proximity sensor and the proximity sensor target being provided on a corresponding selected fixed location, the reciprocally moving component comprising the polished rod or one of the one or more components.

37. The method of claim 36, wherein the reciprocally moving component comprises the polished rod, and the proximity sensor target is provided on the polished rod.

\* \* \* \* \*